United States Patent
Ogasawara

(10) Patent No.: US 6,938,352 B2
(45) Date of Patent: Sep. 6, 2005

(54) HIGH-PRECISION COG SYSTEM MEASURING INSTRUMENT

(75) Inventor: Hiroomi Ogasawara, Yamakita-Machi (JP)

(73) Assignee: Ogasawara Precision Engineering LTD, Kanagawa-ken (JP)

(*) Notice: Subject to any disclaimer, the term of this patent is extended or adjusted under 35 U.S.C. 154(b) by 0 days.

(21) Appl. No.: 10/682,403

(22) Filed: Oct. 10, 2003

(65) Prior Publication Data

US 2004/0143978 A1 Jul. 29, 2004

(30) Foreign Application Priority Data

Jan. 28, 2003 (JP) ........................................ 2003-018234

(51) Int. Cl.$^7$ ................................................. G01B 5/20
(52) U.S. Cl. ............................................ 33/549; 33/511
(58) Field of Search .......................... 33/503, 556, 559, 33/549, 551, 553, 554, 555, 558, 561, 501.7, 501.9, 501.11, 501.14

(56) References Cited

U.S. PATENT DOCUMENTS

| | | | |
|---|---|---|---|
| 4,166,323 A | | 9/1979 | Maag |
| 4,532,715 A | | 8/1985 | Sterki |
| 5,136,527 A | * | 8/1992 | Koretz ........................ 33/556 |
| 5,505,003 A | * | 4/1996 | Evans et al. ............... 33/501.7 |
| 5,662,439 A | * | 9/1997 | Reese et al. ............... 33/501.7 |
| 6,065,220 A | * | 5/2000 | Ohtsuka et al. ............... 33/549 |

FOREIGN PATENT DOCUMENTS

DE 10123496 A1 12/2002

OTHER PUBLICATIONS

Coordinate Measurement Part 2: Evaluation of Performance of Three–dimensional . . . , published by Japanese Standards Assoc. JIS B 7440–2: 1997 (ISO 10360–2: 1994).

* cited by examiner

*Primary Examiner*—Christopher W. Fulton
(74) *Attorney, Agent, or Firm*—Jacobson Holman PLLC

(57) ABSTRACT

A high-precision cog measuring instrument having as its operating axes an X-axis, a Y-axis, and a Z-axis, which are at right angles to each other, the device moving an object to be measured parallel to the X, Y, and Z axes, and in addition, rotating it around the Z-axis, while measuring the external shape of the object to be measured. The device including a main body, having a base, secured to an installation face where the high-precision cog system measuring instrument is to be installed; a Y-direction moving table, which is mounted on the base and can move in one horizontal direction; and an X-direction moving table, which supports a measuring element and can move in another horizontal direction at a right angle to the Y-direction moving table; a body for supporting the object to be measured having a section for supporting the object to be measured, which having a section for supporting the object to be measured, which can move in the Z-axial direction and rotate around the Z-axis.

5 Claims, 5 Drawing Sheets

HIGH-PRECISION COG SYSTEM MEASURING INSTRUMENT

BACKGROUND OF THE INVENTION

1. Field of the Invention

This invention relates to a high-precision cog system measuring instrument which measures the shapes of precise mechanical parts, and which is suitable for evaluating shapes in a cylindrical coordinate system or a polar coordinate system, such as a cog.

2. Description of the Related Art

As shown in FIGS. 4A and 4B, conventional cog measuring instruments used in measuring, for instance, the tooth shape, pitch, and tooth line, comprises a rotating table, attached to the horizontal arm of a three-dimensional measuring instrument, or a modification thereof (Cf. "Coordinate Measurement Part 2: Evaluation of Performance of Three-dimensional Coordinate measuring instrument" published by the Japanese Standards Association. JIS B 7440-2: 1997 (ISO 10360-2: 1994)).

In the device shown in FIG. 4A, a table TX moves in the X direction and is provided on a base BS; a table TZ moves in the Z direction and is provided next to the table TX; a table TY moves in the Y direction and is provided next to the table TZ. A supporting column CL is provided at the position touched by a measuring element P at the tip of the Y-direction moving table TY, and supports the vertical axis of the object to be measured W while enabling it to rotate.

In the device shown in FIG. 4B, the object to be measured W is placed on the X-direction moving table, and the measuring element P is attached to the Z-direction moving table TZ on the Y-direction moving table, which is provided on the base BS.

Each of the measuring instruments shown in FIGS. 4A and 4B comprises a part which supports the object to be measured W, and a mechanism moving in three or two axes for supporting the measuring element P.

According to this constitution, in the measuring instruments shown in FIGS. 4A and 4B, the part which supports the object to be measured W, and the mechanism moving in three or two axes which supports the measuring element P, apply separate loads.

FIGS. 5A and 5B show how the part which supports the object to be measured W, and the mechanism moving in three or two axes which supports the measuring element P, become deformed as a consequence of these loads.

Therefore, the base BS becomes warped by these two parts, making it difficult to match the origin and axial directions of the absolute coordinate system which the object to be measured W belongs to with the origin and axial directions of the coordinate system taking the measuring element P as a reference. Consequently, there are inevitable errors in the measurement of the cog, making it impossible to increase precision.

SUMMARY OF THE INVENTION

This invention has been realized after consideration of the problems described above, and aims to provide a high-precision cog system measuring instrument wherein warping does not easily occur or spread.

In order to achieve the above objects, the invention provides a high-precision cog system measuring instrument having as its operating axes an X axis, a Y axis, and a Z axis, which are at right angles to each other, the device moving an object to be measured parallel to the X, Y, and Z axes, and in addition, rotating it around the Z axis, while measuring the external shape of the object to be measured. The device comprises a main body, comprising a base, secured to an installation face where the high-precision cog system measuring instrument is to be installed; a Y-direction moving table, which is mounted on the base and can move in one horizontal direction; and an X-direction moving table, which supports a measuring element and can move in another horizontal direction at a right angle to the Y-direction moving table; a body for supporting the object to be measured having a section for supporting the object to be measured, which can move in the Z axial direction and rotate around the Z axis, the object to be measured being supported by the section for supporting the object to be measured, and the measuring element being positioned so as to be able to touch the object to be measured and attain a free angle with respect to the installation face; and a connecting part, which can secure the body for supporting the object to be measured to the main body in such a manner as to allow them to be finely adjusted.

DESCRIPTION OF THE PREFFERED EMBODIMENTS

Figure 1A:
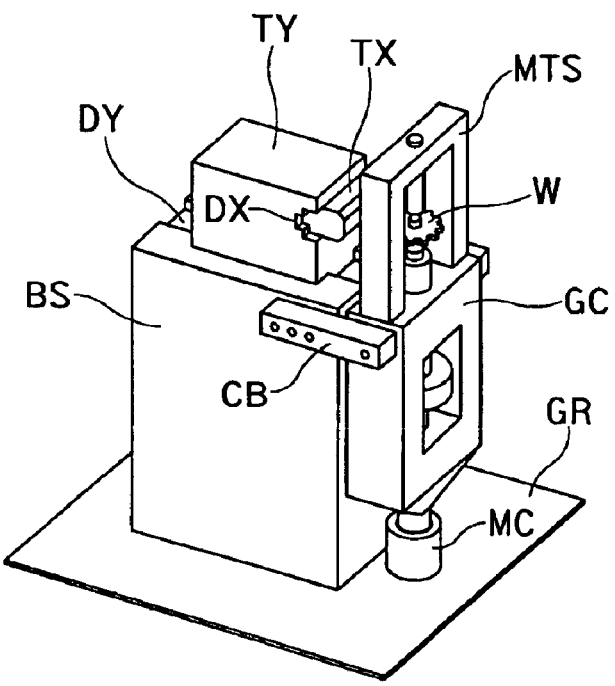
FIGS. 1A and 1B are perspective view of an embodiment of this invention, taken from two diagonal directions.
Figure 1B:
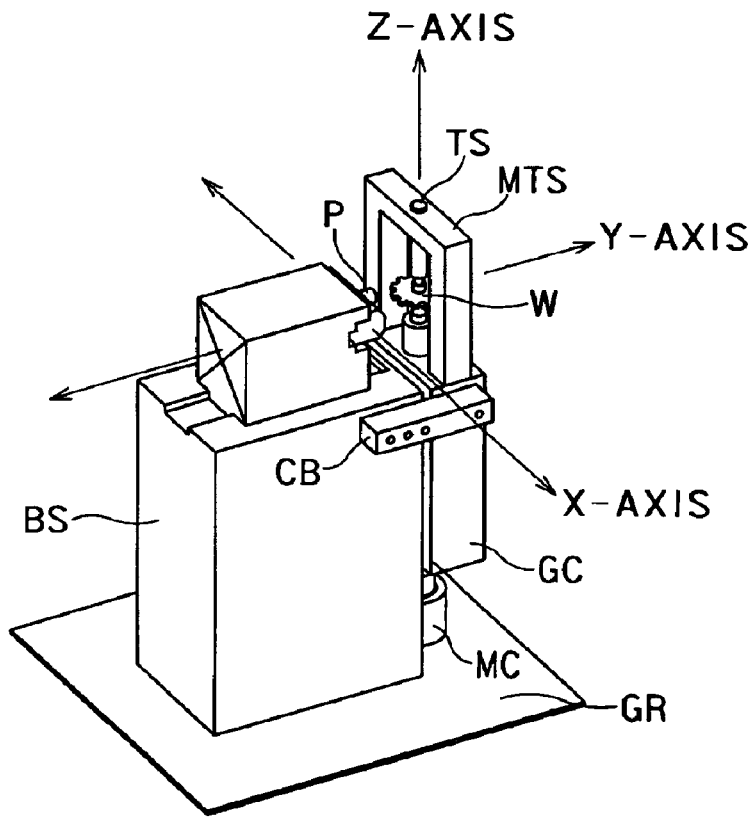

FIGS. 1A and 1B respectively show a front side perspective view and a rear side perspective view of the external constitution of an embodiment of this invention. As shown in FIGS. 1A and 1B, a body for supporting the object to be measured and a main body are connected by connecting parts, and are provided on a horizontal ground surface GR which the measuring instrument is installed on.

The main body comprises a base BS, a Y-direction moving table, which is mounted on the base BS, and an X-direction moving table, which is mounted on the Y-direction moving table. In other words, the main body comprises an X-Y table.

The body for supporting the object to be measured comprises a tip support TS, which supports the object to be measured W, such as a cog, while enabling it to rotate, rise, and fall, a tip support stand MTS, a gate-like column GC, which supports the tip support stand MTS, and a column stand MC which receives the weight of the gate-like column GC.

That is, the body for supporting the object to be measured comprises a rotatable Z-axis elevator. The body for supporting the object to be measured must be provided as near to the vertical axis as allows it to rotate, so that the Z axis does not tilt and become affected by gravity. With its Z axis aligned to the vertical direction, the body for supporting the object to be measured is connected to the base BS of the main body by a pair of adjustable connecting bars CB, and securely supported in a single piece with the base BS.

The base BS is placed on the ground surface GR, and the pair of connecting bars CB on each side hold the gate-like column GC of the body for supporting the object to be measured. The top face of the base BS is a horizontal plane, and contains a groove, which forms one part of a Y-axis carrying mechanism DY; the Y-direction moving table TY is able to move along this groove in one direction within the horizontal plane.

A groove, which forms one part of an X-axis carrying mechanism DX, is provided in the side face of the Y-direction moving table opposite the body for supporting the object to be measured, and supports the X-direction moving table, which comprises the measuring element mechanism P having the measuring element P, while enabling it to move at a right angle to the direction of the Y-direction moving table, that is, in the horizontal direction.

The body for supporting the object to be measured faces the main body, and comprises the tip support TS and the tip support stand MTS in a position facing the X-direction moving table, so as to support the object to be measured W while enabling it to rotate, and rise and fall in a perpendicular direction (Z direction).

The tip support TS and the tip support stand MTS are mounted on the gate-like column GC, which is pivot-supported by the column stand MC so as to oscillate freely.

The connecting bars CB securely connect the gate-like column GC to the base BS of the main body, in such a manner that it becomes vertical by using its oscillating structure. Since the connecting bars CB connect the top of the base BS to the top of the gate-like column GC, the main body and the body for supporting the object to be measured are secured in a single piece.

According to this constitution, the tip support TS supports the object to be measured W while allowing to rotate freely around a vertical axis; on the other hand, the measuring mechanism P is provided so as to face the object to be measured W, and is supported in such a manner that the X-direction moving table is able to move in the X direction with respect to the Y-direction moving table, and the Y-direction moving table is able to move in the Y direction with respect to the base BS.

As a result, in the main body, the measuring element P is supported so that it can move in the X and Y directions, and, in the body for supporting the object to be measured, the object to be measured W is supported so that it can rise and fall in the Z direction and also rotate around the Z axis. Therefore, the object to be measured W can be measured while moving it along the X, Y, and Z axes, and rotating it around the Z axis.

Figure 2:
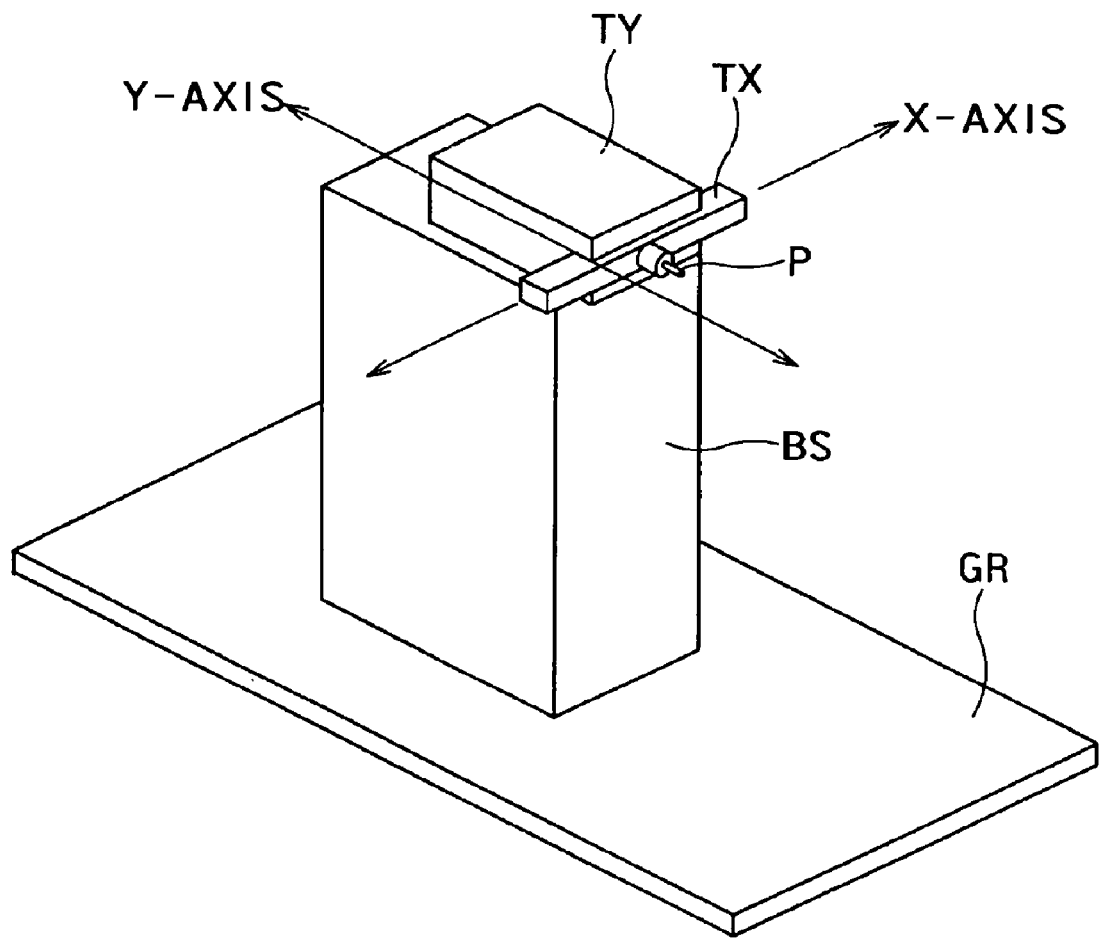
FIG. 2 is a perspective view of the detailed structure of a main body in the embodiment of FIGS. 1A and 1B.

FIG. 2 shows the structure of the main body wherein the Y-direction moving table, which can move in the Y-axis direction, is provided on the base BS, mounted on the ground face GR. An X-direction moving table is supported on a side face of the Y-direction moving table facing an unillustrated body for supporting the object to be measured, in such a manner that the X-direction moving table can move in the X-axis direction. The measuring element mechanism P is provided in the center of the side of the X-direction moving table facing the body for supporting the object to be measured. The measuring element mechanism P has parts, including a probe, for scanning the external shape of the object to be measured.

As shown in FIG. 2, the structure of the main body is symmetrical in the Y axis; in the X axis, the relatively lightweight Y-direction moving table and X-direction moving table are arranged asymmetrical to the base BS, but the overall structure is symmetrical, ensuring that warping caused by asymmetry is minimal.

Figure 3A:
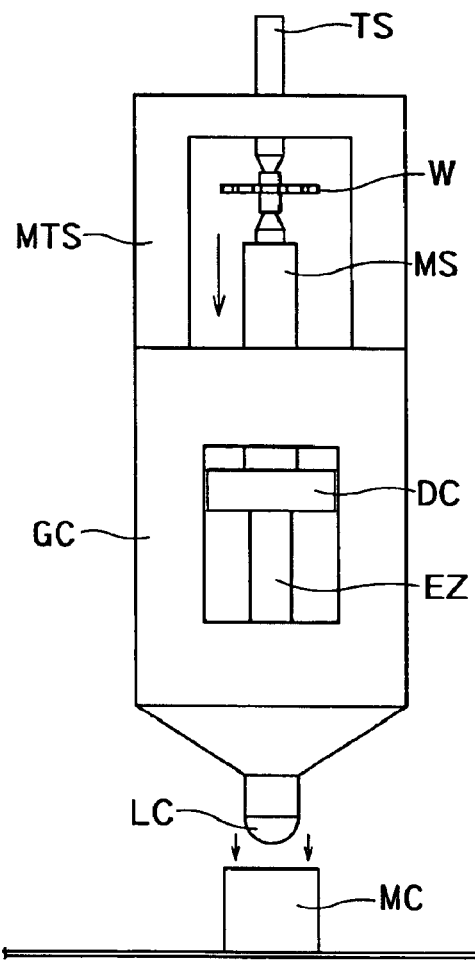
FIGS. 3A and 3B are perspective views showing the detailed structure of a body for supporting the object to be measured in the embodiment of FIGS. 1A and 1B.
Figure 3B:
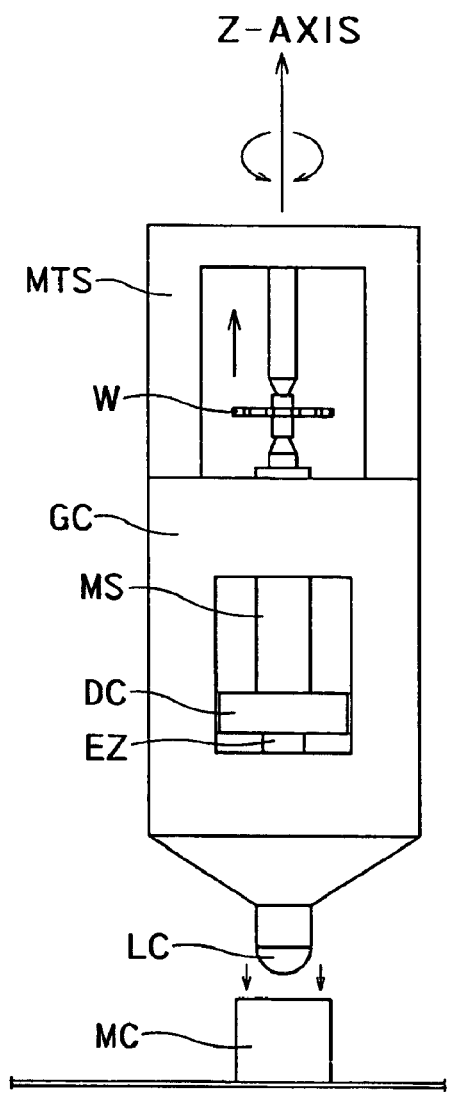
Figure 4A:
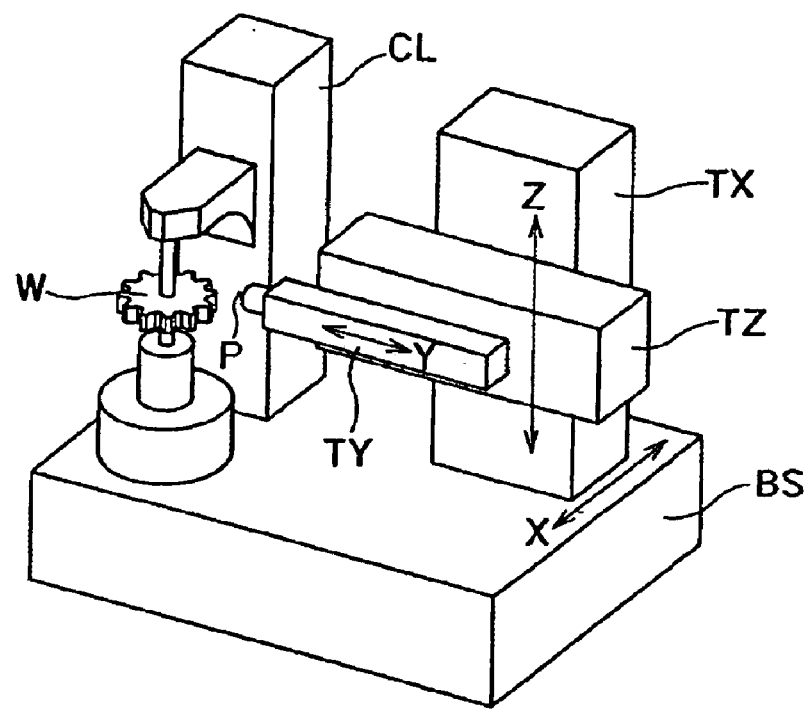
FIGS. 4A and 4B are perspective views of one example of the constitution of a conventional high-precision cog measuring instrument.
Figure 4B:
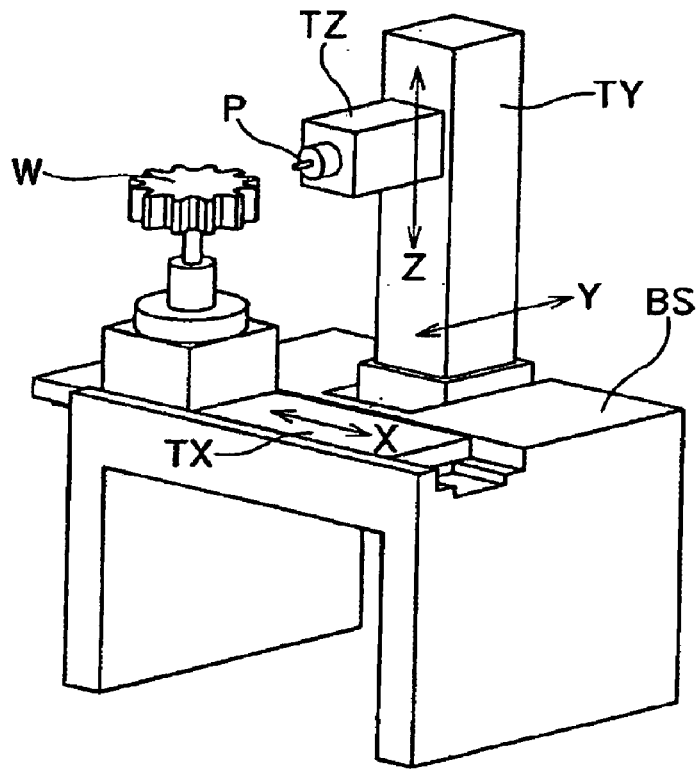
Figure 5A:
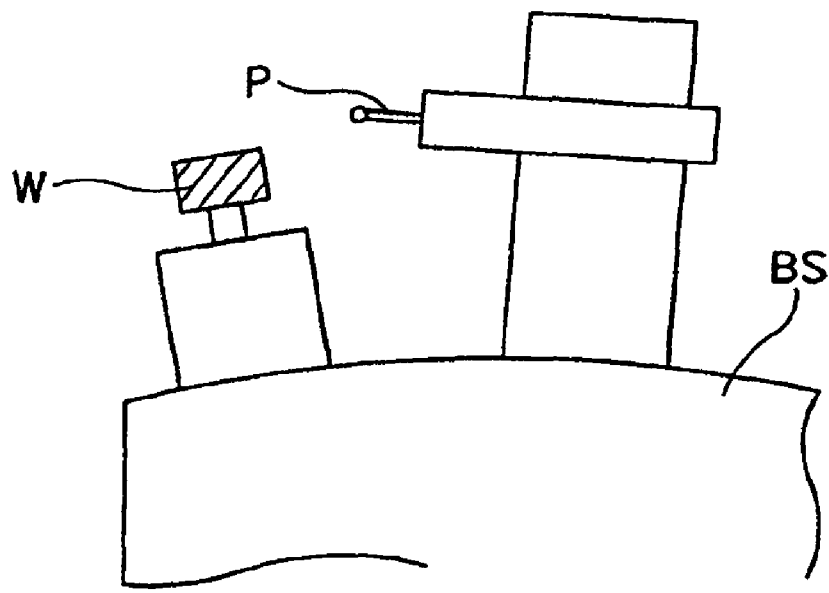
FIGS. 5A and 5B are diagrams illustrating warping in a conventional high-precision cog measuring instrument.
Figure 5B:
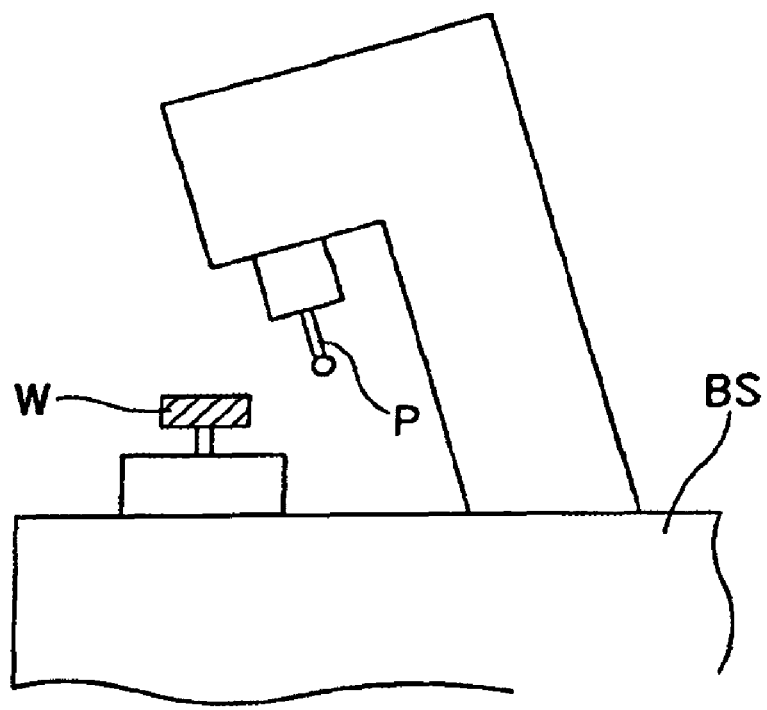

FIGS. 3A and 3B show the detailed structure of the body for supporting the object to be measured. The object to be measured W is placed on the tip of the top of a main axis spindle MS, and auxiliarily supported by the tip support TS, supported by the tip support stand MTS. At the time of measuring, the object to be measured W is securely supported for a moment by the tip support TS near to the tip of the top of the main axis spindle MS.

The main axis spindle MS is supported on the center line of the column stand GC, which is shaped like a rectangular frame, and rotatably driven by a Z axis rotating mechanism DC, provided near the bottom end of the main axis spindle MS in the column stand GC.

A rise-and-fall mechanism comprising a Z-axis carrying mechanism EZ is connected to the bottom of the Z axis rotating mechanism DC in the central line of rotation of the Z axis, so as to lie along a single axis. The Z-axis carrying mechanism EZ uses the column stand GC as a table and moves the body for supporting the object to be measured, which is comprised of four parts (the Z axis rotating mechanism DC, the main axis spindle MS, the object to be measured W, and the tip support TS), upwards and downwards.

The bottom end of the gate-like column GC has the shape of a quadrangular pyramid, the load center LC of the bottom of the pyramid directly contacting the column stand MC to form a pivot structure. The column stand MC may be indented, as in FIGS. 3A and 3B, or protruding, it being possible to use any type of pivot structure wherein the gate-like column GC is supported at a single point.

As shown in FIGS. 3A and 3B, since the body for supporting the object to be measured is symmetrical in the Z axis, it is unlikely to warp; furthermore, this structure ensures that the body for supporting the object to be measured is not easily affected by deviation between the origin and axial directions of the absolute coordinate system, which the object to be measured W, which would cause the warping, belongs to, with the origin and axial directions of the coordinate system taking the measuring element P as a reference.

Since the body for supporting the object to be measured is symmetrical in the Z axis, it becomes possible to reduce deviation between the origin and axial directions of the absolute coordinate system, which the object to be measured W belongs to, with the origin and axial directions of the coordinate system taking the measuring element P as a reference, this deviation being caused by changes in the external shape during measuring, and in particular by thermal warping of the body for supporting the object to be measured due to changes in temperature. Moreover, the Z axis which the object to be measured is rotated around is same as the Z axis which it is raised and lowered on, and the body for supporting the object to be measured comprises a single body; consequently, there is one less part where error may arise from the mechanism which forms the axis.

The measuring instrument of this invention is comprised by connecting the main body and the body for supporting the object to be measured having the constitutions described above by using the connecting bars. That is, the axis of the body for supporting the object to be measured shown in FIGS. 3A and 3B is aligned with the Z axis opposite the main body shown in FIG. 2, and, in that position, the body for supporting the object to be measured is secured to the main body by the connecting bars. Consequently, the main body and the body for supporting the object to be measured are each provided in predetermined attachment states, and secured together in a single piece.

Therefore, the object to be measured W can be held and measured in a state which is most suitable for measuring it.

Modifications

In the embodiment described above, only one pair of connecting bars is provided as the connecting parts, but this number can be increased, and the single piece unity between the main body and the body for supporting the object to be measured can be increased by provided the connecting bars closer to the object to be measured.

The connecting parts may themselves be provided with mechanisms which prevent the transmission of thermal warping, and with position-adjusting mechanisms.

As described above, according to this invention, a main body, comprising as an X-base in X and Y axes, is secured in a single piece to a body for supporting the object to be measured, comprising a rotatable Z-axis elevator, by connecting bars, thereby preventing warping caused by the individual movements of the constituent parts, and making it possible to provide a measuring instrument with higher precision.

What is claimed is:

1. A high-precision cog system measuring instrument having as operating axes an X axis, a Y axis, and a Z axis, which are at right angles to each other, and moving an object to be measured parallel to the X, Y, and Z axes, and in addition, rotating the object around the Z axis, while measuring an external shape of the object to be measured, the instrument comprising:

a main body, comprising a base, secured to an installation face where the high-precision cog system measuring instrument is to be installed; a Y-direction moving table, which is mounted on the base and can move in one horizontal direction; and an X-direction moving table, which supports a measuring element and can move in another horizontal direction at a right angle to the Y-direction moving table;

a body for supporting the object to be measured having a section for supporting the object to be measured, which can move in the Z axial direction and rotate around the Z axis, the object to be measured being supported by the section for supporting the object to be measured, and the measuring element being positioned so as to be able to touch the object to be measured and attain a free angle with respect to the installation face; and a connecting part, which can secure the body for supporting the object to be measured to the main body in such a manner as to allow them to be finely adjusted.

2. The high-precision cog system measuring instrument as described in claim 1, wherein the body for supporting the object to be measured comprises a mechanism which rises and descends along the Z axis, and a rotating mechanism which rotates around the Z axis.

3. The high-precision cog system measuring instrument as described in claim 2, wherein the body for supporting the object to be measured has an approximately rectangular frame-like shape, the mechanism which rises and descends along the Z axis and the rotating mechanism which rotates around the Z axis being provided on the Z axis, so that the body for supporting the object to be measured is symmetrical in a face formed by the Z axis and another axis at a right angle to the Z axis.

4. The high-precision cog system measuring instrument as described in claim 1, wherein a load center of the body for supporting the object to be measured touches the installation face.

5. The high-precision cog system measuring instrument as described in claim 1, wherein the connecting part remains symmetrical to the overall high-precision cog system measuring instrument, while securing the body for supporting the object to be measured near to an attachment position of the object to be measured and near to the measuring element of the main body.

* * * * *